Patented Mar. 19, 1929.

1,705,484

UNITED STATES PATENT OFFICE.

FREDERICK G. KEYES, OF CAMBRIDGE, MASSACHUSETTS, ASSIGNOR, BY MESNE ASSIGNMENTS, TO NATIONAL REFRIGERATING COMPANY, OF BOSTON, MASSACHUSETTS, A CORPORATION OF MASSACHUSETTS.

FLUID-STORING MATERIAL.

No Drawing. Original application filed November 6, 1923, Serial No. 673,103. Divided and this application filed January 15, 1925. Serial No. 2,601.

The present invention relates to improvements in gas or liquid storing materials useful in the arts generally, and particularly in refrigerating apparatus, one form of such an apparatus being shown in my application for patent for refrigeration filed June 8, 1921, Serial Number 475,855, of which this application is a continuation in part. This application furthermore is a continuation in part of my application filed Sept. 26, 1922, Serial No. 590,668. This application is a division of my application Serial No. 673,103, filed November 6, 1923.

By way of example, the liquid or gas to be stored is referred to hereinafter as a "refrigerant," such as ammonia, which is commonly used in refrigerating apparatus, although it is to be understood that my invention is not limited to the use of this particular fluid or to refrigerating apparatus.

The storing material in a still or generator is an important element in a refrigerator apparatus and should preferably be a solid material capable of taking up the refrigerant and holding it in such a physical state as to maintain its vapor pressure below that of the free liquid. Several important factors enter into the production of a practical and highly efficient storing material to be used in a safe refrigerator apparatus, and the desirable properties or qualities of such a material are:

1. It must be stable at elevated temperatures;
2. It must not react under any conditions of use with the metal used to contain it;
3. The unit weight of the material must take a large amount of refrigerant;
4. Its heat capacity must be as small as possible and,
5. It must be brought into such a physical state by the addition of cementitious and other substances of a reaction velocity promoting character and preferred physical and chemical treatment as to remain under use in the form of discrete hard and porous granules capable of presenting a large surface for ready speedy absorption of the refrigerant, this being a prime requisite for rapid and efficient refrigeration.

It is evident in selecting a cementitious substance designed to confer the property of hardness in the grains of the final storing material that the chosen cements or cementing compounds retain their property at high temperatures, to which on occasion the gas storing material may be exposed.

I have found that by special treatment of cellular material, such as charcoal, with certain metallic salts, for example, zinc chloride, chromic acid, etc., a substance is produced which I term "activated charcoal" and one well suited as a storing material for use in refrigerating apparatus. This material condenses the refrigerant on its surfaces, holding it with great tenacity at room temperature, and readily and completely giving it up at moderately elevated temperatures, 150° C. The use of "activated charcoal" as a storing material in refrigerating machines, due to its large bulk per unit weight necessitates a large still which in turn offers a large surface for radiation involving a possible diminution in the efficiency of operation of the apparatus, as compared with the efficiencies obtainable when other materials are used. Moreover because of the small specific quantity of refrigerant taken up much energy is lost in heating the charcoal. The great advantage, however, of an absorbent such as charcoal is that it takes up the refrigerant with extreme rapidity and this is an advantage at the end of the distillation period when it is necessary to start the return of the refrigerant promptly from the refrigerating chamber. For example, one gram of charcoal in its optimum state of activity has a heat capacity of about .25 calories per gram. The maximum amount of ammonia, for example, which a certain sample will take up is, for example, 0.125 gram and the heat necessary to drive this off at 150° C. is about 59 calories. In heating to 150° C. therefore, about 31 calories are used up owing to the heat capacity of the absorbent material so that 34 percent of the energy has been thrown away on heating the material. It is clear therefore that an increase in efficiency would be obtained if less heat were necessary to disengage the gas from the storing material and less heat were necessary to raise the material to the point where the refrigerant is given up. In the case of other absorbing substances such as silica gel or metallic oxide gels the same general state of fact obtains as for charcoal or carbon in the absorbing state. A variety of substances have been found useful as absorbing and as storing materials for refrigerating machines such as the halides and in particular those of the metals of the second group of Mendelejeff periodic system (hereinafter referred to as the "second chemical group"), i. e., beryllium, magnesium, calcium, strontium, barium, radium, with the sub-group comprising zinc, cadmium, and mercury, the chlorides of this group and particularly the highly deliquescent ones being active and readily available for the purpose of absorbing and storing fluids and gases, and of these substances calcium chloride, because of its cheapness and availability in the market, has been selected for the purposes of illustrating my invention, as hereinafter set forth. Each gram of the last named substance takes up 1.22 grams of ammonia and the ammonia moreover enters into chemical combinations as stated in the formula:

$$CaCl_2.8NH_3.$$

There are other calcium chloride compounds, one said to contain 4 molecules of ammonia, but the formula given corresponds to the maximum amount of ammonia and moreover possesses a very small pressure of ammonia at ordinary temperature. It was found in using this material alone that the rate at which it would take up ammonia was very small due to a tendency to pulverize and to pack, thus preventing ready access of the refrigerant.

It became, therefore, a problem of discovering the best physical state and mode of preparation of this material so as to maintain it in the still under the conditions of operation in such a state that it would expose the maximum surface, retain a high relative velocity and remain in a hard, durable yet porous condition offering no resistance to the free circulation of the refrigerant among the granules of the absorbent. It was found that Portland cement mixed with the chloride to the amount of 10 to 15 per cent and sufficient water to form a thick paste could be slowly baked in the presence of ammonia so as to give a material in hard porous grains which maintained their form under repeated heating and cooling in the distilling and taking up of the ammonia. This material, however, while serviceable may develop a tendency, due to its composition, to dehydrate, when operated at extremely elevated temperatures.

It has been known for a long time that halides of the metals form with oxides of the metals certain oxy-halides which are in effect hard cements. For example, zinc chloride forms with zinc oxide certain oxy-chlorides and also that magnesium-chloride forms with magnesium oxide similar oxy-chlorides which are, as stated above, in effect hard cements. Moreover, it is a fact of common observation that sodium silicate will, upon heating, blow up to a porous, spongy mass. I make use of the above mentioned characteristics of these substances together with such catalytic action as they afford to produce a hard porous storing material for refrigerant gases and liquids having a large taking up capacity due to the catalytic action of the added oxy-chloride substances affording thereby a high rate of taking up, the physical structure being such as to persist and withstand the disintegrating action of rapid heating and cooling and changes of volume produced by taking up and disengaging refrigerant, as follows:

Dry calcium chloride is mixed with 10 per cent of molecular proportions dry zinc oxide (ZnO) and zinc chloride ($ZnCl_2$), or is mixed with 10 per cent of molecular proportions of dry magnesium oxide (MgO) and magnesium chloride ($MgCl_2$). After thorough incorporation in a ball mill the selected mixture is then moistened with sodium silicate or other alkali-metal silicate such as potassium or even beryllium silicate in the mixture when dry and the pasty mass dried first in a current of air at about 250° C. The material is then broken up and sifted and then treated at 500° C. in the presence of ammonia, whereupon an extremely porous, hard material is obtained which possesses the quality of taking up ammonia with great rapidity, and, moreover, one which does not decompose on heating to a high temperature (700–750° C.).

When either one of the calcium chloride mixtures is used alone as the storing material, due to the fact that it is of small bulk and possesses the property of rapidly taking up a large amount of refrigerant per unit weight when cooled and readily giving it up when heated to a temperature of about 150° C., a smaller containing still is used in the apparatus than when activated charcoal alone is used as the storing material therein, and the radiation losses at the still of the apparatus are therefore minimized. The described material has been used alone in a commercially operating machine. I have found, also, by mixing approximately equal volumes of activated charcoal and one or the other of the above mentioned calcium chloride mixtures in a small still, the charcoal serving to support and to maintain even distribution of the chloride mixture throughout the still and aiding to promptly start the refrigerating period due to the extreme speed with which it takes up the refrigerant, that highly efficient operation of the apparatus is obtained.

Furthermore, I have discovered that by adding alundum cement, a product obtainable in the market under that name, which is a flour like powder, and appears to be essentially aluminum oxide with additions of materials such as iron oxide and orthoclase binders, to either one of the halide and oxy-chloride mixtures mentioned above, or to a halide alone, that an increased absorbing or adsorbing and storing result is obtained, accompanied by extreme speed of taking up the gas or fluid while maintaining the desired small bulk as compared to the activated charcoal.

It thus becomes possible, for example, by the addition of a quantity, up to 10 percent, of alundum cement in the preparation of either the zinc oxy-chloride mixture or the magnesium oxy-chloride mixture, mentioned above, to increase the speed of absorption of said mixture, and by varying the quantity added to any given mixture the speed of absorption of the mixture can be increased or decreased, as desired.

It is sometimes found desirable to include in any of the mixtures mentioned above, or to add thereto, other absorbing, adsorbing, or storing materials, such as ferric chloride, chromic chloride, copper sulphate, and the like, or kieselguhr, ground porcelain, pumice and the like, or iron oxide, or aluminum oxide and the like, to alter either the absorbing characteristic or the hardness of the mixture, or to meet varying conditions of service of the storing material.

The ferric chloride, chromic chloride, and like substances when included would serve as "contact" or "transfer" mediums in the absorbing action of the said above mentioned mixtures on the refrigerant. For certain purposes and for desired effects the ferric chloride, chromium chloride, and the like could be used to materially or completely take the place of the said above mentioned mixtures.

What I claim is:

1. A hard storing material for fluids, comprising calcium chloride, and magnesium oxy-chloride, and alundum cement.

2. A hard storing material for fluids, comprising anhydrous calcium chloride, and magnesium oxy-chloride, and alundum cement.

3. A storing material for fluids comprising a halide capable of forming addition compounds with fluids, an oxy-chloride cement, and alundum cement.

4. A storing material for fluids comprising a metal halide capable of forming addition compounds with fluids, an oxy-chloride cement, and alundum cement.

In testimony whereof I hereto affix my signature.

FREDERICK G. KEYES.